United States Patent [19]
Popp

[11] 3,956,683
[45] May 11, 1976

[54] TAPER TYPE OF BATTERY CHARGER

[75] Inventor: Ralph Popp, Pittsburgh, Pa.

[73] Assignee: Westinghouse Air Brake Company, Swissvale, Pa.

[22] Filed: Mar. 6, 1974

[21] Appl. No.: 448,459

[52] U.S. Cl. .............................. 320/23; 320/39; 321/18
[51] Int. Cl.² .............................. H02J 7/10
[58] Field of Search .................. 320/22–24, 320/39, 40, 51, 21; 321/18, 19

[56] References Cited
UNITED STATES PATENTS

| | | | |
|---|---|---|---|
| 2,810,877 | 10/1957 | Silver | 321/19 |
| 3,073,999 | 1/1963 | Petrigalla | 320/40 |
| 3,098,962 | 7/1963 | Berg | 320/39 |
| 3,205,425 | 9/1965 | Moyer | 321/18 |
| 3,363,162 | 1/1968 | Bawden | 320/22 X |
| 3,602,794 | 8/1971 | Westhaver | 320/39 |

Primary Examiner—J. D. Miller
Assistant Examiner—Robert J. Hickey
Attorney, Agent, or Firm—J. B. Sotak; R. W. McIntire, Jr.

[57] ABSTRACT

This disclosure relates to an automatic taper charging battery charger having a power transformer and a series connected variable reactor, a pair of rectifiers powered by the transformer, a pair of output terminals coupled to one of the rectifiers, a sensing and control circuit powered by the other rectifier and responsive to the voltage of a battery connected to the output terminals for controlling the impedance of the variable reactor and in turn regulating the voltage developed across the power transformer and thereby controlling the current charging rate supplied to the battery.

8 Claims, 1 Drawing Figure

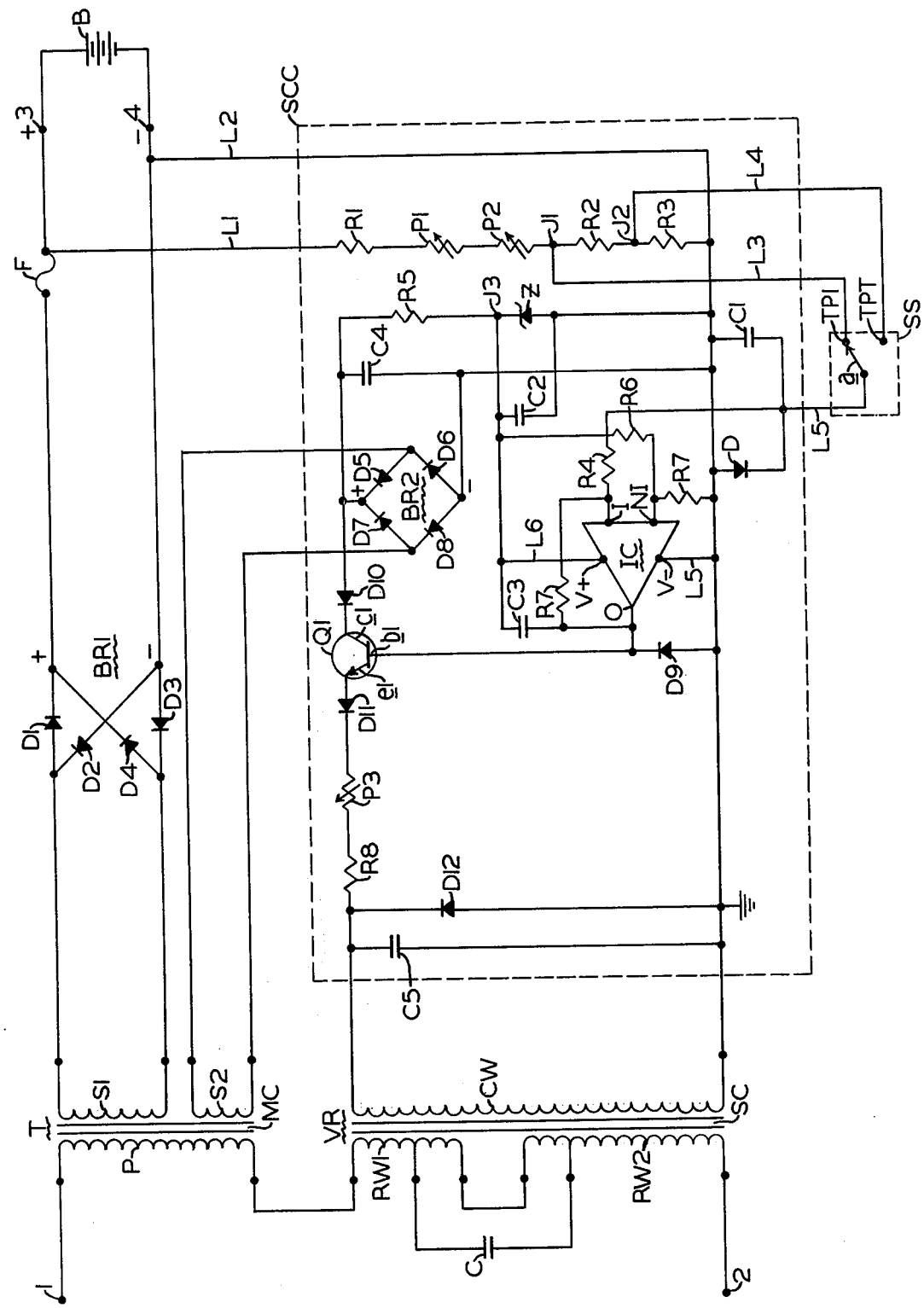

TAPER TYPE OF BATTERY CHARGER

FIELD OF THE INVENTION

This invention relates to an automatic battery charger and, more particularly, to a taper type of battery charging circuit for normally applying a float charging rate to a storage battery and for selectively supplying an equalizing charging rate to a storage battery employing a power transformer, a variable reactor, a pair of full-wave rectifiers, an electronic control circuit and a manual switch.

BACKGROUND OF THE INVENTION

It is expeditious and convenient in certain types of installations to utilize storage batteries as a source of power for operating various electrical devices, such as, lights, motors, relays, radio equipment or the like. It is essential to maintain the battery fully charged at all times so that sufficient electrical power is available during subsequent demands by the load. Thus, it is common practice to provide an appropriate battery charger for restoring the electrical energy that was depleted from the battery by the load. However, the battery charger should not overcharge the storage battery for extended periods of time since violent gassing occurs and the loss of electrolyte can cause irreparable damage or can result in reduced power capacity. Thus, it is essential that the charging rate should be controlled in accordance with the condition of the battery, namely, the voltage condition since the voltage is a function of the charge condition of the battery. It is apparent that when the battery reaches a fully charged condition, the charging current should be automatically cut-off in order to obtain maximum efficiency and to realize long battery life. However, when using a taper type of battery charging technique, it has been found to be a requisite to build into the battery charger, an overcharging or equalizing charging capability. When a fully charged battery has not been used for an extended period of time, it is generally necessary to provide an overcharging or equalizing charge in order to recondition the battery for meeting subsequent load demands. Accordingly, it is good preventative maintenance to periodically overcharge a dormant or seldom used battery at least once a month. The controlled overcharge is periodically given in order to keep the battery in a peak condition and to prevent the development of inequalities in the condition of the individual cells. Further, when replacing an expired battery, it is common practice to condition the new battery by overcharging it for a short period of time. In addition to the above-noted requirement, an acceptable battery charger must be capable of withstanding large transient voltages, short circuited output conditions and accidental reverse polarity connections without resultant damage or permanent failure.

OBJECTS OF THE INVENTION

Accordingly, it is an object of this invention to provide a new and improved automatic taper charging battery charger.

Another object of this invention is to provide a novel taper type of battery charger having a float charging rate as well as an equalizing charging rate.

A further object of this invention is to provide a unique automatic battery charging device which is not adversely effected during a short circuited output condition.

Still another object of this invention is to provide a new and unique battery charging circuit which is not permanently damaged when the polarity of a battery is reversely connected across the output terminals.

Still a further object of this invention is to provide a novel and improved battery charger which is protected against damage from high voltage surges.

Yet another object of this invention is to provide an improved electronically controlled automatic taper battery charging circuit having a normal float charging rate and a selectable equalizing charging rate.

Yet a further object of this invention is to provide a novel and unique automatic taper type of battery charger having a power transformer, a variable reactor, a pair of full-wave rectifiers and a voltage sensing and a current control circuit for establishing the charging current applied to a storage battery.

An additional object of this invention is to provide a new and improved automatic taper charging battery charger which is simple in design, economical in cost, reliable in operation, durable in use and efficient in service.

SUMMARY OF THE INVENTION

In accordance with the present invention, the automatic taper type of battery charging circuit includes a power transformer having a primary winding and a pair of secondary windings. The primary winding is connected in series with the reactive winding of a variable reactor. The primary winding and the reactive winding are in turn connected to an alternating current voltage source. One of the pair of secondary windings is connected to the a.c. terminals of a first full-wave bridge rectifier network, and the other of the pair of secondary windings is connected to the a.c. terminals of a second full-wave bridge rectifier network. The d.c. terminals of the first full-wave bridge rectifier network are connected to the output terminals across which is connected to a storage battery. The d.c. terminals of the second full-wave bridge rectifier network are utilized to supply d.c. operating voltage to an electronic sensing and control circuit. The sensing and control circuit includes a resistive type of voltage divider network connected across the output terminals for sensing the voltage level of the storage battery. A voltage reference network including a voltage breakdown device is coupled to the d.c. terminals of the second full-wave bridge rectifier. The voltage divider sensing network and voltage breakdown reference device are coupled to the input of an integrated circuit operational amplifier. The output of the integrated circuit operational amplifier is connected to the input of a variable impedance transistor amplifier. The output of the transistor amplifier is connected to the d.c. control winding of the variable reactor. A semiconductive diode is connected across the d.c. control winding to protect the sensing and control circuits from high voltage transients due to the sudden collapse of the magnetic field in control winding. A fuse element is connected between one d.c. terminal of the first full-wave bridge rectifier and one of the output terminals to protect the sensing and control circuit from damage due to the reverse polarity connection of a storage battery. A selection switching device is connected to the resistive divider network and is normally effective to establish a float charging rate or is alternately switched to effectively establish an equalizing charging rate.

The foregoing objects and other attendant features and advantages of this invention will become more fully apparent from the ensuing detailed description when considered in conjunction with the accompanying drawing wherein:

DESCRIPTION OF THE DRAWINGS

The single FIGURE drawing is a schematic circuit diagram illustrating a preferred embodiment of the two level taper type of an automatic battery charging circuit of the present invention.

DESCRIPTION OF THE PREFERRED EMBODIMENT

Referring now to the single FIGURE of the drawings, there is shown the automatic taper charging battery charger arrangement employing a power transformer T, a magnetic variable reactor VR, a first full-wave bridge rectifier BR1, a second full-wave bridge rectifier BR2 and a sensing and control circuit SSC.

A conventional power supply, such as, a 110 voltage, 60 hertz, alternating current voltage source is connected across input terminals 1 and 2 of the battery charger. The stepdown type of power transformer T includes a magnetic core MC upon which is wound a primary winding P and a pair of secondary windings S1 and S2. One end of the primary winding P is connected to input terminal 1 while the other end of the primary winding P is connected to one end of coil RW1 of the reactive winding of the variable reactor VR. The variable reactor VR includes a conventional three-legged magnetic saturable structure formed of low cost silicon iron laminations and schematically represented in the drawing by character SC. The coil RW1 of the reactive winding is wound on one of the outer legs of the three-legged magnetic core SC while a coil RW2 of the reactive winding is wound on the other of the outer legs of the three-legged magnetic saturable core SC. A d.c. control winding CW is wound on the central leg of the three-legged magnetic core SC, and the two reactive windings RW1 and RW2 are arranged in such a manner that little, if any, a.c. voltage is induced into the control winding CW. As shown, a tuning capacitor C is connected to tap points located intermediate the ends of reactive windings RW1 and RW2 to effectively increase the impedance at low charging levels.

In viewing the single FIGURE, it will be seen that the respective ends of the secondary winding S1 of power transformer T are connected to the a.c. terminals of a first full-wave bridge rectifier BR1. The bridge rectifier BR1 includes a plurality of semiconductive diode rectifiers D1, D2, D3 and D4 which are suitably poled to supply d.c. current to the respective output terminals 3 and 4. As shown, the positive output terminal 3 is connected to the positive terminal of the bridge rectifier BR1 via fuse element F, the purpose of which will be described hereinafter, while the negative output terminal 4 is directly connected to the negative terminal of the bridge rectifier. A suitable storage battery B, such as, a multi-cell rechargeable lead acid or nickel iron battery, is appropriately connected to output terminals 3 and 4.

It will be observed that the respective ends of the secondary winding S2 are connected to the a.c. terminals of a second full-wave bridge rectifier BR2. The bridge rectifier BR2 also includes a plurality of semiconductive diode rectifiers D5, D6, D7 and D8 which are suitably poled to establish the given polarity of voltage on the d.c. terminals, as shown. The bridge rectifier BR2 supplies the necessary d.c. operating potential to the sensing and control circuit SCC. As shown, a filtering capacitor C4 is coupled across the output of bridge rectifier BR2 to remove ripple and smooth the d.c. supply voltage.

The sensing and control circuit SSC includes a voltage divider network which is connected across the respective output or battery terminals 3 and 4 via leads L1 and L2, respectively. The voltage divider senses the voltage level appearing across terminals 3 and 4. The voltage divider includes a pair of adjustable resistors, such as, potentiometers P1 and P2, and a plurality of fixed resistors, such as, resistors R1, R2 and R3. The potentiometers P1 allows a wide range of voltage adjustments that is necessary to compensate for differences in the fully charged voltage levels of the various types of rechargeable batteries that may be connected to output terminals 3 and 4. That is, the voltage rating is different for different types of batteries so that the potentiometer P1 is factory set for the type of battery that is to be used in the field. After the initial voltage adjustment is set at the factory, small voltage adjustments may only be made by the user by selectively varying the resistance of potentiometer P2. As shown, the junction point J1 between potentiometer P2 and resistors R2 and the junction point J2 between resistors R2 and R3 are connected to a selection switching device, such as, a single pole double-throw switch SS. The junction point J1 is connected to terminal point TP1 via lead L3 while the junction point J2 is connected to terminal point TP2 via lead L4. The selection switch SS includes a movable or transfer contact a which in the present instance is shown contacting terminal point TP1. When the selection switch SS is in the position shown namely transfer contact a is engaging terminal point TP1, a float charging rate is established while when the switch is in the opposite position, namely when contact a engages point TP2, an equalizing charging rate is furnished by the battery charger. The transfer contact a is connected via lead L5 and resistor R4 to one input of a linear integrated circuit operational amplifier IC, the details of which will be described presently. A parallel combination of a diode D and capacitor C1 is connected between lead L5 and the common or ground lead, the purpose of which will be described hereinafter. A reference voltage divider including current limiting resistor R5 and voltage breakdown device or zener diode Z is shown connected to the d.c. terminals of bridge rectifier BR2. The d.c. voltage appearing across the zener diode will remain substantially constant since slight voltage variations of the d.c. output voltage appears across the output terminals of bridge rectifier BR2 will be reflected in the amount of voltage developed across resistor R5. A ripple filtering capacitor C2 is connected in parallel with the zener diode Z. As shown, the junction point J3 between resistor R5 and zener diode Z is connected to the other input of the integrated circuit operational amplifier via resistor R6.

It will be noted that the integrated circuited operational amplifier IC has a pair of inputs I and NI and a single output O. The operational amplifier may be of differential input signal type in that it functions by the difference in the signal levels that are applied to the two inputs. The operational amplifier may be of the type manufactured and sold by the Fairchild Semiconductor Corporation of Mountainview, Calif. and identified by mode designation No. U67741393. The input I is termed the inverting input terminal while the input NI is termed the noninverting input terminal. The noninverting input NI is connected to ground via resistor R7. It will be noted that resistors R6 and R7 are connected between junction point J3 and ground so that the junction between resistors R6 and R7 becomes the fixed or reference voltage level for the noninverting input NI. A negative supply terminal V— is connected to ground via lead L5. A positive voltage terminal V+ is connected to the junction point J3 of the resistor R5 and diode Z via lead L6. A filtering capacitor C3 is from junction point J3 to the output terminal O. A feedback resistor R7 is coupled from output terminal O to the input terminal I of the operational amplifier IC. The output terminal O of the operational amplifier IC is connected to the cathode electrode of diode D9 while its anode electrode is connected to ground. The output terminal O of the amplifier IC is also connected to the input of a variable impedance transistor amplifier stage.

As shown, the amplifier stage includes an NPN transistor Q1 having an emitter electrode $e1$, a collector electrode $c1$ and a base electrode $b1$. The output terminal O of the integrating circuit IC is directly connected to the base electrode $b1$ of transistor Q1. The collector electrode $c1$ of transistor Q1 is connected to the cathode electrode of protection diode D10 while its anode electrode is connected to the positive d.c. terminal of bridge rectifier BR2. The emitter electrode $e1$ of transistor Q1 is connected to the anode electrode of diode D11. The cathode electrode of diode D11 is connected to one end of a variable current adjusting potentiometer P3. The other end of potentiometer P3 is connected to one end of a current limiting resistor R8. The other end of resistor R8 is connected to one end of the control winding CW while the other end of the control winding CW is connected to ground. A capacitor C5 and a surge protection diode D12 are connected in parallel with the control winding CW.

In describing the operation, it will be assumed that the battery charging circuit is intact and functioning properly, that the a.c. supply voltage is connected to input terminals 1 and 2, and that the rechargeable storage battery B is properly connected across the output terminals 3 and 4. Let us further assume that the selection switch SS is in the position shown wherein the transfer contact $a$ is in contact with terminal point TP1. Under this condition which is normal operation, the battery charging circuit is set to supply a float charging rate to the storage battery B. As mentioned above, the charging level is adjusted and calibrated at the factory in accordance with the number of cells and type of storage batteries used by the purchaser. The large potentiometer P1 allows a wide range of adjustment for factory personnel while the small potentiometer P2 permits the purchaser to increase the battery voltage only about two percent (2%) above the set factory level so that excessive gassing and electrolysis will not result in damage to the battery. At one hundred percent (100%) capacity, the present battery charger supplies approximately 6 amperes of current to the storage battery B. As the battery voltage increases toward its rated value the charging current gradually decreases and at full battery voltage the charging current is cut off. It will be seen that the battery voltage is constantly sensed by the voltage divider network, and initially the voltage at junction point J1 is set to equal the reference voltage at junction point between resistorss R6 and R7, which as mentioned is the voltage reference for input NI. When load demand results in a decrease in the battery voltage, the voltage at junction point J1 will proportionally decrease so the input I will become less than the input NI of the operational amplifier IC. Thus, a proportional positive output signal will be developed on the output terminal O of operational amplifier IC. The positive signal is applied to the base electrode $b1$ so that the transistor Q1 is rendered conductive. It will be appreciated that the output current is proportional to the signal level applied to base electrode $b1$. The conduction of transistor Q1 results in current flowing through the d.c. control winding CW of the variable reactor VR. The d.c. current flowing through winding CW causes the magnetic core SC to be driven toward saturation so that the impedance of the a.c. windings RW1 and RW2 is decreased in proportion to the amount of flux produced by the control winding CW. The reduction of the impedance of reactive windings RW1 and RW2 results in a decrease of voltage developed across the reactive windings RW1 and RW2 and causes an increase in the voltage developed across the primary winding P of the main transformer T. Thus, a voltage increase is induced by the primary P and is developed across secondary winding S1 so that charging current begins to flow from bridge rectifier BR1 into storage battery B. The amount of charging current or the charging rate is dependent upon the terminal battery voltage which, in turn, is dependent on the demands of the battery load. If the load demands are great, the voltage of the battery B may decrease substantially so that a higher rate of charging current is initially furnished by the bridge rectifier BR1. As the battery voltage across output terminals gradually increases, the change is continuously sensed by the voltage divider network and the voltage at junction point J1 continually rises so that the voltage differential between input NI and I decreases. Thus, the output signal on output terminal O proportionally decreases and reduces the conduction of transistor Q1. As the conduction of transistor Q1 correspondingly decreases, the amount of current flowing through control winding CW also decreases so that the impedance of the reactive windings RW1 and RW2 proportionally increases which thereby reduced the voltage developed across primary winding P. The voltage induced into secondary winding S is correspondingly reduced and the charging current is proportionally reduced. Thus, the charger charging rate is continuously and gradually reduced or tapered until the battery B is charged to full capacity. When the battery is fully charged, the voltages at the junction point J1 and at the junction of resistors R6 and R7 cause the signals at input terminals NI and I to produce an insufficient output signal on terminal O to maintain the transistor Q1 conductive. The diode assists in turning off transistor Q1 since terminal O is unable to be reduced to zero potential. The nonconduction of transistor Q1, cuts off the d.c. control current to control winding CW so that maximum impedance is exhibited by the reactive windings RW1 and RW2. Thus, at cut-off the voltage across the primary winding is well below the applied supply voltage of terminals 1 and 2, and the peak value of the voltage induced into secondary winding S1 is substantially equal to or slightly less than the battery voltage. Hence, the charging current is substantially zero. The cut-off condition will prevail as long as the battery remains at full capacity. When the battery voltage is again decreased by load demands the voltage divider network will immediately sense the decrease, and the charger will once more begin supplying charging current to the battery. The charging current will continue to be supplied to the battery B until the battery is fully charged, and then the battery charger will be automatically cut off in the manner described above.

Normally the selection switch SS will be left in the position shown wherein transfer contact $a$ engages the terminal point TP1 so that the battery charger will repeatedly cycle between various float charging rates and cut off as the battery is loaded. As previously mentioned, it is occasionally necessary to supply a higher than the normal float charging rate to a dormant or seldom used battery or to a new battery, at the time it is placed into service. In order to initiate the higher or equalizing charging rate, it is simply necessary to move the transfer contact $a$ of selection switch SS from terminal TP1 to terminal point TP2. When contact $a$ engages point TP2, the junction point J2 is effectively connected to input NI of operational amplifier IC. It will be appreciated that the voltage sensing level of junction point J2 is less than that of junction point J1 so that it will immediately appear that the battery is undercharged regardless of whether or not the battery voltage is at the rated value. Thus, the overhcarging or equalizing charging rate is established, and in actual practice, the voltage level is approximately seven percent (7%) greater than the float level charging voltage. It will be appreciated that the equalizing charging voltage level should be set at a value which will not result in violent gassing of the battery so that excessive loss of electrolyte is prevented. The equalizing charging rate also has a tapered curve characteristic so that the charging current continuously and gradually decreases to a zero value at cut off. After the seldom used battery has been reconditioned or the new battery has been conditioned, the battery charger is returned to its float charging position by switching the transfer contact $a$ so that it again engages terminal point TP1. Thus, the storage battery is maintained at its maximum peak efficiency and at full capacity so that long battery life is realized with a minimum amount of cost and time.

As mentioned above, reverse polarity protection positively ensures that the battery charger is not damaged by burn out or the like by the diodes of bridge rectifier BR1 and fuse F. If the battery B is inadvertently connected to the reverse manner from that shown in the drawings, the four diodes of the bridge rectifier BR1 immediately conduct and short circuit the battery B through the fuse element F. The short circuiting causes the fuse F to blow thereby immediately breaking the circuit so no resulting impairment will occur to the various current sensitive elements of the charger. In addition, the diode D protects the operational amplifier IC while the diode D10 protects the transistor Q1 against damage and destruction on inadvertent reverse connection of the battery.

As previously mentioned, the sensing and control circuit SSC is protected against transients and voltage surges which might occur when the d.c. current is suddenly interrupted. The sudden opening of the circuit causes the magnetic field in winding CW to abruptly collapse so that a high current surge is produced; however, the diode D12 snubs the surge and prevents damage to the solid-state components and circuit elements.

It will be seen that during an a.c. power failure or voltage outage maximum or extended standby power is provided since the control circuit is rendered inoperative and no current is supplied to the control winding of the saturable reactor. Thus, there is very little current drain on battery B during a period of a power outage so that the life of the battery is much longer than heretofore possible with other battery chargers.

Further, it will be appreciated that the accidental short circuiting of the output terminals 3 and 4 does not adversely effect the operation or does not damage the battery charger. It will be seen that the shorting of terminals 3 and 4 causes the impedance of the primary winding P to assume a very low resistive value so that most of the line voltage appears across the reactive windings RW1 and RW2. The power transformer P effectively operates as a current transformer with the d.c. control current limited to a negligible amount by a substantial reduction of the S2 winding voltage feeding bridge BR2 causing reactor VR to remain in a desired high impedance state.

In addition, the maximum obtainable output is limited to a safe level which in the present instance is approximately 125 percent of the rated output.

It will be appreciated that various changes, modification and alterations may be made in the above-described battery charger without departing from the spirit and scope of the present invention. Accordingly, it will be appreciated that although the subject invention has been illustrated and described with various details in order to afford a full and clear understanding, it will be understood that various details are not to be necessarily construed as limiting and should be taken in an illustrative and diagrammatic sense only.

Having now described the invention, what I claim as new and desire to secure by Letters Patent, is:

1. An automatic taper charging battery charger comprising, a pair of input terminals for connection to a source of a.c. voltage, a transformer having a primary and a pair of secondary windings, a d.c. controlled variable reactor having controlled and control windings, said primary and controlled windings connected in series to said pair of input terminals, a first rectifier coupled to one of said pair of secondary windings and a second rectifier coupled to the other of said pair of secondary windings, a pair of output terminals connected to said first rectifier, and a control circuit connected to said second rectifier, said control circuit having a voltage sensing network coupled to said output terminals and having an output circuit coupled to said control winding for controlling the impedance of said d.c. controlled variable reactor, said control circuit including a linear operational amplifier for controlling the current in said output circuit by proportionally varying the impedance of a semiconductive impedance device in accordance with the voltage appearing on said output terminals, and switching means for normally establishing a float charging rate and for selectively establishing an equalizing charging rate for reconditioning a seldom used battery and for conditioning a new battery.

2. An automatic taper charging battery charger as defined in claim 1, wherein a fuse is coupled between said first rectifier and said pair of output terminals to protect the charger against damage due to a reverse battery connection.

3. An automatic taper charging battery charger as defined in claim 1, wherein a snubbing diode is connected across said control winding to prevent high current surges from damaging said control circuit.

4. An automatic taper charging battery charger as defined in claim 1, wherein said semiconductive impedance device is an NPN transistor having an emitter, a collector and base electrode.

5. An automatic taper charging battery charger as defined in claim 4, wherein a diode is connected in a forward direction to said emitter electrode to aid in cutting off said transistor.

6. An automatic taper charging battery charger as defined in claim 1, wherein said first and second rectifiers are full-wave semiconductive bridge rectifiers.

7. An automatic taper charging battery charger as defined in claim 1, wherein said voltage sensing network includes a resistance divider having a plurality of fixed and variable resistors.

8. An automatic taper charging battery charger as defined in claim 1, wherein said switching means includes a pair of contacts electrically connected to opposite ends of a resistor of said voltage sensing network for selectively switching the float charging rate to the equalizing charging rate.

* * * * *